US010656822B2

(12) United States Patent
Bailey et al.

(10) Patent No.: US 10,656,822 B2
(45) Date of Patent: *May 19, 2020

(54) SYSTEMS, DEVICES, AND METHODS FOR INTERACTING WITH CONTENT DISPLAYED ON HEAD-MOUNTED DISPLAYS

(71) Applicant: THALMIC LABS INC., Kitchener (CA)

(72) Inventors: Matthew Bailey, Kitchener (CA); Stefan Alexander, Elmira (CA)

(73) Assignee: North Inc., Kitchener, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,642

(22) Filed: Oct. 31, 2017

(65) Prior Publication Data

US 2018/0067621 A1  Mar. 8, 2018

Related U.S. Application Data

(63) Continuation of application No. 15/282,535, filed on Sep. 30, 2016.

(Continued)

(51) Int. Cl.
*G06F 3/0487* (2013.01)
*G02B 27/01* (2006.01)
(Continued)

(52) U.S. Cl.
CPC ......... *G06F 3/0487* (2013.01); *G02B 27/017* (2013.01); *G02B 27/0172* (2013.01);
(Continued)

(58) Field of Classification Search
None
See application file for complete search history.

(56) References Cited

U.S. PATENT DOCUMENTS 3,408,133 A   10/1968  Lee
3,712,716 A   1/1973   Cornsweet et al.
(Continued)

FOREIGN PATENT DOCUMENTS

JP   61-198892 A    9/1986
JP   10-319240 A   12/1998
(Continued)

OTHER PUBLICATIONS

Amitai, "P-27: A Two-dimensional Aperture Expander for Ultra-Compact, High-Performance Head-Worn Displays," *SID Symposium Digest of Technical Papers*, vol. 36, No. 1 (2005), pp. 360-363.

(Continued)

*Primary Examiner* — Benjamin C Lee
*Assistant Examiner* — Krishna P Neupane
(74) *Attorney, Agent, or Firm* — Thomas Mahon (57) ABSTRACT

Systems, devices, and methods that enable sophisticated and inconspicuous interactions with content displayed on a head-mounted display are described. A head-mounted display includes an eye-tracker and the user also carries/wears a wireless portable interface device elsewhere on their body, such as a ring. The wireless nature of the portable interface device enables a small and unobtrusive form factor. The portable interface device includes an actuator that, when activated by the user, causes the portable interface device to wirelessly transmit a signal (e.g., a radio frequency signal or a sonic signal). A selection operation performed by the user is defined as the user activating the actuator of the portable interface device while the user is substantially concurrently gazing at a displayed object (as detected by the eye-tracker). In response to the selection operation, the head-mounted display displays a visual effect to the user.

7 Claims, 3 Drawing Sheets

Related U.S. Application Data (60) Provisional application No. 62/236,060, filed on Oct. 1, 2015.

(51) Int. Cl.
| | | |
|---|---|---|
| *G06F 3/01* | | (2006.01) |
| *G06F 3/02* | | (2006.01) |
| *G06F 3/038* | | (2013.01) |
| *G06F 3/0484* | | (2013.01) |

(52) U.S. Cl.
CPC ......... *G02B 27/0176* (2013.01); *G06F 3/013* (2013.01); *G06F 3/014* (2013.01); *G06F 3/0227* (2013.01); *G06F 3/0383* (2013.01); *G06F 3/04842* (2013.01); *G02B 2027/014* (2013.01); *G02B 2027/0178* (2013.01); *G02B 2027/0187* (2013.01); *G06F 3/02* (2013.01); *G06F 2203/0331* (2013.01); *G06F 2203/0381* (2013.01); *G06F 2203/0384* (2013.01)

(56) References Cited

U.S. PATENT DOCUMENTS

| | | | |
|---|---|---|---|
| 4,978,213 | A | 12/1990 | El Hage |
| 5,103,323 | A | 4/1992 | Magarinos et al. |
| 5,231,674 | A | 7/1993 | Cleveland et al. |
| 5,467,104 | A | 11/1995 | Furness, III et al. |
| 5,589,956 | A | 12/1996 | Morishima et al. |
| 5,596,339 | A | 1/1997 | Furness, III et al. |
| 5,742,421 | A | 4/1998 | Wells et al. |
| 5,959,622 | A * | 9/1999 | Greer .................. H04N 7/147 348/E7.081 |
| 6,008,781 | A | 12/1999 | Furness, III et al. |
| 6,027,216 | A | 2/2000 | Guyton et al. |
| 6,184,847 | B1 | 2/2001 | Fateh et al. |
| 6,204,829 | B1 | 3/2001 | Tidwell |
| 6,236,476 | B1 | 5/2001 | Son et al. |
| 6,317,103 | B1 | 11/2001 | Furness, III et al. |
| 6,353,503 | B1 | 3/2002 | Spitzer et al. |
| 6,377,277 | B1 | 4/2002 | Yamamoto |
| 6,639,570 | B2 | 10/2003 | Furness, III et al. |
| 6,700,310 | B2 * | 3/2004 | Maue .................. B60R 25/24 310/319 |
| 6,972,734 | B1 | 12/2005 | Ohshima et al. |
| 7,473,888 | B2 | 1/2009 | Wine et al. |
| 7,640,007 | B2 | 12/2009 | Chen et al. |
| 7,684,105 | B2 | 3/2010 | Lamontagne et al. |
| 7,747,113 | B2 | 6/2010 | Mukawa et al. |
| 7,773,111 | B2 | 8/2010 | Cleveland et al. |
| 7,850,306 | B2 | 12/2010 | Uusitalo et al. |
| 7,925,100 | B2 | 4/2011 | Howell et al. |
| 7,927,522 | B2 | 4/2011 | Hsu |
| 8,120,828 | B2 | 2/2012 | Schwerdtner |
| 8,179,604 | B1 | 5/2012 | Prada Gomez et al. |
| 8,188,937 | B1 | 5/2012 | Amafuji et al. |
| 8,355,671 | B2 | 1/2013 | Kramer et al. |
| 8,560,976 | B1 | 10/2013 | Kim |
| 8,634,119 | B2 | 1/2014 | Bablumyan et al. |
| 8,666,212 | B1 | 3/2014 | Amirparviz |
| 8,704,882 | B2 | 4/2014 | Turner |
| 8,922,481 | B1 | 12/2014 | Kauffmann et al. |
| 8,922,898 | B2 | 12/2014 | Legerton et al. |
| 8,970,571 | B1 | 3/2015 | Wong et al. |
| 8,971,023 | B2 | 3/2015 | Olsson et al. |
| 9,086,687 | B2 | 7/2015 | Park et al. |
| 9,135,708 | B2 | 9/2015 | Ebisawa |
| 9,477,079 | B2 | 10/2016 | Bailey et al. |
| 9,766,449 | B2 | 9/2017 | Bailey et al. |
| 2001/0033402 | A1 | 10/2001 | Popovich |
| 2002/0003627 | A1 | 1/2002 | Rieder |
| 2002/0007118 | A1 | 1/2002 | Adachi et al. |
| 2002/0030636 | A1 | 3/2002 | Richards |
| 2002/0093701 | A1 | 7/2002 | Zhang et al. |
| 2002/0120916 | A1 | 8/2002 | Snider, Jr. |
| 2004/0174287 | A1 | 9/2004 | Deak |
| 2005/0012715 | A1 | 1/2005 | Ford |
| 2006/0238707 | A1 | 10/2006 | Elvesjo et al. |
| 2007/0078308 | A1 | 4/2007 | Daly |
| 2007/0132785 | A1 | 6/2007 | Ebersole, Jr. et al. |
| 2009/0109241 | A1 | 4/2009 | Tsujimoto |
| 2009/0179824 | A1 | 7/2009 | Tsujimoto et al. |
| 2009/0207464 | A1 | 8/2009 | Wiltshire et al. |
| 2009/0258669 | A1 | 10/2009 | Nie et al. |
| 2009/0322653 | A1 | 12/2009 | Putilin et al. |
| 2010/0053555 | A1 | 3/2010 | Enriquez et al. |
| 2010/0060551 | A1 | 3/2010 | Sugiyama et al. |
| 2010/0142015 | A1 | 6/2010 | Kuwahara et al. |
| 2010/0149073 | A1 | 6/2010 | Chaum et al. |
| 2010/0150415 | A1 | 6/2010 | Atkinson et al. |
| 2010/0239776 | A1 | 9/2010 | Yajima et al. |
| 2012/0002256 | A1 | 1/2012 | Lacoste et al. |
| 2012/0139817 | A1 | 6/2012 | Freeman |
| 2012/0169752 | A1 | 7/2012 | Kurozuka |
| 2012/0182309 | A1 | 7/2012 | Griffin et al. |
| 2012/0188158 | A1 | 7/2012 | Tan et al. |
| 2012/0249797 | A1 * | 10/2012 | Haddick .................. G06F 1/163 348/158 |
| 2012/0290401 | A1 | 11/2012 | Neven |
| 2012/0302289 | A1 | 11/2012 | Kang |
| 2013/0009853 | A1 | 1/2013 | Hesselink et al. |
| 2013/0016292 | A1 | 1/2013 | Miao et al. |
| 2013/0016413 | A1 | 1/2013 | Saeedi et al. |
| 2013/0088413 | A1 | 4/2013 | Raffle et al. |
| 2013/0135722 | A1 | 5/2013 | Yokoyama |
| 2013/0165813 | A1 | 6/2013 | Chang et al. |
| 2013/0169560 | A1 * | 7/2013 | Cederlund .............. G06F 3/013 345/173 |
| 2013/0198694 | A1 | 8/2013 | Rahman et al. |
| 2013/0215235 | A1 | 8/2013 | Russell |
| 2013/0222384 | A1 | 8/2013 | Futterer |
| 2013/0265437 | A1 | 10/2013 | Thörn et al. |
| 2013/0285901 | A1 | 10/2013 | Lee et al. |
| 2013/0300652 | A1 * | 11/2013 | Raffle .................... A61B 3/113 345/156 |
| 2013/0332196 | A1 | 12/2013 | Pinsker |
| 2013/0335302 | A1 | 12/2013 | Crane et al. |
| 2014/0045547 | A1 | 2/2014 | Singamsetty et al. |
| 2014/0125760 | A1 | 5/2014 | Au et al. |
| 2014/0198034 | A1 | 7/2014 | Bailey et al. |
| 2014/0198035 | A1 | 7/2014 | Bailey .................... G06F 3/014 345/156 |
| 2014/0202643 | A1 | 7/2014 | Hikmet et al. |
| 2014/0204455 | A1 | 7/2014 | Popovich et al. |
| 2014/0204465 | A1 | 7/2014 | Yamaguchi |
| 2014/0226193 | A1 | 8/2014 | Sun |
| 2014/0232651 | A1 | 8/2014 | Kress et al. |
| 2014/0285429 | A1 | 9/2014 | Simmons |
| 2014/0368896 | A1 | 12/2014 | Nakazono et al. |
| 2015/0036221 | A1 | 2/2015 | Stephenson |
| 2015/0049112 | A1 * | 2/2015 | Liu ...................... G06T 19/006 345/633 |
| 2015/0058649 | A1 * | 2/2015 | Song .................... G06F 1/3231 713/323 |
| 2015/0156716 | A1 | 6/2015 | Raffle et al. |
| 2015/0205126 | A1 | 7/2015 | Schowengerdt |
| 2015/0205134 | A1 | 7/2015 | Bailey et al. |
| 2015/0268821 | A1 | 9/2015 | Ramsby et al. |
| 2015/0277559 | A1 * | 10/2015 | Vescovi .................. G06F 3/014 345/173 |
| 2015/0325202 | A1 | 11/2015 | Lake et al. |
| 2015/0362734 | A1 | 12/2015 | Moser et al. |
| 2015/0378162 | A1 | 12/2015 | Bailey et al. |
| 2016/0033771 | A1 | 2/2016 | Tremblay et al. |
| 2016/0202081 | A1 | 7/2016 | Debieuvre et al. |
| 2016/0238845 | A1 | 8/2016 | Alexander et al. |
| 2016/0274365 | A1 | 9/2016 | Bailey et al. |
| 2016/0274758 | A1 | 9/2016 | Bailey |
| 2016/0327796 | A1 | 11/2016 | Bailey et al. |
| 2016/0327797 | A1 | 11/2016 | Bailey et al. |
| 2016/0349514 | A1 | 12/2016 | Alexander et al. |
| 2016/0349515 | A1 | 12/2016 | Alexander et al. |
| 2016/0349516 | A1 | 12/2016 | Alexander et al. |
| 2016/0377865 | A1 | 12/2016 | Alexander et al. |

(56) References Cited

U.S. PATENT DOCUMENTS

| | | | |
|---|---|---|---|
| 2016/0377866 | A1 | 12/2016 | Alexander et al. |
| 2017/0068095 | A1 | 3/2017 | Holland et al. |
| 2017/0083115 | A1* | 3/2017 | Speck .................. G06F 3/011 |
| 2017/0115483 | A1 | 4/2017 | Aleem et al. |
| 2017/0153701 | A1 | 6/2017 | Mahon et al. |
| 2017/0205876 | A1 | 7/2017 | Vidal et al. |
| 2017/0212290 | A1 | 7/2017 | Alexander et al. |
| 2017/0212349 | A1 | 7/2017 | Bailey et al. |
| 2017/0219829 | A1 | 8/2017 | Bailey |
| 2017/0299956 | A1 | 10/2017 | Holland et al. |
| 2017/0343796 | A1 | 11/2017 | Bailey et al. |
| 2017/0343797 | A1 | 11/2017 | Bailey et al. |
| 2018/0007255 | A1 | 1/2018 | Tang |

FOREIGN PATENT DOCUMENTS

| | | |
|---|---|---|
| JP | 2013-127489 A | 6/2013 |
| JP | 2013-160905 A | 8/2013 |
| KR | 10-2004-0006609 A | 1/2004 |
| WO | 2014/155288 A2 | 10/2014 |
| WO | 2015/123775 A1 | 8/2015 |

OTHER PUBLICATIONS

Ayras et al., "Exit pupil expander with a large field of view based on diffractive optics," *Journal of the SID*, vol. 17, No. 8 (2009), pp. 659-664.
Chellappan et al., "Laser-based display: a review," *Applied Optics*, vol. 49, No. 25 (2010), pp. 79-98.
Cui et al., "Diffraction from angular multiplexing slanted volume hologram gratings," *Optik*, vol. 116 (2005), pp. 118-122.
Curatu et al., "Dual Purpose Lens for an Eye-tracked Projection Head-Mounted Display," *International Optical Design Conference 2006*, SPIE-OSA, vol. 6342 (2007), pp. 63420X-1-63420X-7.
Curatu et al., "Projection-based head-mounted display with eye-tracking capabilities," *Proc. of SPIE*, vol. 5875 (2005), pp. 58750J-1-58750J-9.
Essex, "Tutorial on Optomechanical Beam Steering Mechanisms," College of Optical Sciences, University of Arizona, 2006, 8 pages.
Fernandez et al., "Optimization of a thick polyvinyl alcohol-acrylamide photopolymer for data storage using a combination of angular and peristrophic holographic multiplexing," *Applied Optics*, vol. 45, No. 29 (2006), pp. 7661-7666.
Hainich et al., "Chapter 10: Near-Eye Displays," in: *Displays—Fundamentals & Applications*, 2011, pp. 439-503.
Hornstein et al., "Maradin's Micro-Mirror—System Level Synchronization Notes," *SID 2012 Digest* (2012), pp. 981-984.
International Search Report and Written Opinion, dated Apr. 25, 2017, for International Application No. PCT/US2016/067246, 10 pages.
International Search Report and Written Opinion, dated Dec. 8, 2016, for International Application No. PCT/US2016/050225, 15 pages.
International Search Report and Written Opinion, dated Jan. 18, 2017, for International Application No. PCT/US2016/054852, 12 pages.
International Search Report and Written Opinion, dated Jun. 8, 2016, for International Application No. PCT/US2016/018293, 17 pages.
International Search Report and Written Opinion, dated Jun. 8, 2016, for International Application No. PCT/US2016/018298, 14 pages.
International Search Report and Written Opinion, dated Jun. 8, 2016, for International Application No. PCT/US2016/018299, 12 pages.
International Search Report and Written Opinion, dated Oct. 13, 2017, for International Application No. PCT/US2017/040323, 16 pages.
International Search Report and Written Opinion, dated Sep. 28, 2017, for International Application No. PCT/US2017/027479, 13 pages.
Itoh et al., "Interaction-free calibration for optical see-through head-mounted displays based on 3D eye localization," *2014 IEEE Symposium on 3D User Interfaces* (3DUI), (2014), pp. 75-82.
Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.
Kessler, "Optics of Near to Eye Displays (NEDs)," *Oasis 2013*, Tel Aviv, Israel, Feb. 19, 2013, 37 pages.
Kress et al., "A review of head-mounted displays (HMD) technologies and applications for consumer electronics," *Proc. of SPIE*, vol. 8720 (2013), pp. 87200A-1-87200A-13.
Kress et al., "Diffractive and Holographic Optics as Optical Combiners in Head Mounted Displays," *Proceedings of the 2013 ACM Conference on Pervasive and Ubiquitous Computing Adjunct Publication*, Zurich, Switzerland, Sep. 8-12, 2013, pp. 1479-1482.
Kress, "Optical architectures for see-through wearable displays," *Bay Area—SID Seminar*, Bay Area, Apr. 30, 2014, 156 pages.
Levola, "7.1: Invited Paper: Novel Diffractive Optical Components for Near to Eye Displays," *SID Symposium Digest of Technical Papers*, vol. 37, No. 1 (2006), pp. 64-67.
Liao et al., "The Evolution of MEMS Displays," *IEEE Transcations on Industrial Electronics*, vol. 56, No. 4 (2009), pp. 1057-1065.
Lippert, "Chapter 6: Display Devices: RSD (Retinal Scanning Display)," in: *The Avionics Handbook*, 2001, 8 pages.
Majaranta et al., "Chapter 3: Eye-Tracking and Eye-Based Human-Computer Interaction," in *Advances in Physiological Computing*, 2014, pp. 39-65.
Merriam-Webster, "Radio Frequencies" retrieved from https://www.merriam-webster.com/table/collegiate/radiofre.htm, retrieved on Jul. 12, 2017, 2 pages.
Schowengerdt et al., "Stereoscopic retinal scanning laser display with integrated focus cues for ocular accommodation," *Proc. of SPIE-IS&T Electronic Imaging*, vol. 5291 (2004), pp. 366-376.
Silverman et al., "58.5L: Late-News Paper: Engineering a Retinal Scanning Laser Display with Integrated Accommodative Depth Cues," *SID 03 Digest*, (2003), pp. 1538-1541.
Takatsuka et al., "Retinal projection display using diffractive optical element," *Tenth International Conference on Intelligent Information Hiding and Multimedia Signal Processing*, IEEE, (2014), pp. 403-406.
Urey et al., "Optical performance requirements for MEMS-scanner based microdisplays," *Conf on MOEMS and Miniaturized Systems*, Spie, vol. 4178 (2000), pp. 176-185.
Urey, "Diffractive exit-pupil expander for display applications," *Applied Optics*, vol. 40, No. 32 (2001), pp. 5840-5851.
Viirre et al., "The Virtual Retina Display: A New Technology for Virtual Reality and Augmented Vision in Medicine," *Proc. of Medicine Meets Virtual Reality* (1998), pp. 252-257.

* cited by examiner

SYSTEMS, DEVICES, AND METHODS FOR INTERACTING WITH CONTENT DISPLAYED ON HEAD-MOUNTED DISPLAYS

BACKGROUND

Technical Field

The present systems, devices, and methods generally relate to interacting with content displayed on head-mounted displays and particularly relate to a multi-input interface that combines eye tracking with a wireless portable interface device.

Description of the Related Art

Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be "wireless" (i.e., designed to operate without any wire-connections to other, non-portable electronic systems); however, a small and lightweight electronic device may still be considered portable even if it includes a wire-connection to a non-portable electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Because they are worn on the body of the user, visible to others, and generally present for long periods of time, form factor (i.e., size, geometry, and appearance) is a major design consideration in wearable electronic devices.

Head-Mounted Displays

A head-mounted display is a form of wearable electronic device that is worn on the user's head and, when so worn, positions a display in the user's field of view. This enables the user to see content displayed on the display at all times, without using their hands to hold the display and regardless of the direction in which the user's head is facing. A wearable head-mounted display may completely occlude the external environment from the user's view, in which case the display is well-suited for virtual reality applications. An example of a virtual reality head-mounted display is the Oculus Rift®.

In an alternative implementation, a head-mounted display may be at least partially transparent and/or sized and positioned to only occupy a portion of the user's field of view. A wearable heads-up display is a head-mounted display that enables the user to see displayed content but does not prevent the user from being able to see their external environment. Wearable heads-up displays are well-suited for augmented reality applications. Examples of wearable heads-up displays include: the Google Glass®, the Optinvent Ora®, the Epson Moverio®, the Microsoft HoloLens®, and the Sony Glasstron®, just to name a few.

Human-Electronics Interfaces and Devices

A human-electronics interface mediates communication between a human and one or more electronic device(s). In general, a human-electronics interface is enabled by one or more electronic interface device(s) that: a) detect inputs effected by the human and convert those inputs into electric signals that can be processed or acted upon by the one or more electronic device(s), and/or b) provide sensory outputs (e.g., typically visual, auditory, and/or tactile) to the human from the one or more electronic device(s), where the user is able to sense the outputs and understand some information represented by the outputs. A human-electronics interface may be one directional or bidirectional, and a complete interface may make use of multiple interface devices. For example, the computer mouse is a one-way interface device that detects inputs effected by a user of a computer and converts those inputs into electric signals that can be processed by the computer, while the computer's display or monitor is a one-way interface device that provides outputs to the user in a visual form through which the user can understand information. Together, the computer mouse and display complete a bidirectional human-computer interface ("HCI"). A HCI is an example of a human-electronics interface.

A wearable electronic device may function as an interface device if, for example, the wearable electronic device: a) includes sensors that detect inputs effected by a user, and b) transmits signals to another electronic device based on those inputs. Sensor-types and input-types may each take on a variety of forms, including but not limited to: tactile sensors (e.g., buttons, switches, touchpads, or keys) providing manual control, acoustic sensors providing voice-control, electromyography sensors providing gestural control, and/or accelerometers providing gestural control.

Interacting with Head-Mounted Displays

Portable electronic devices that include display screens typically require the user to use their hand(s) to carry the device and/or to orient the device so that the user may see, access, receive feedback from, and/or generally interact with the device's display screen. Occupying the user's hand(s) is an inconvenience that can significantly hinder the user's ability to interact with the portable electronic device and/or to interact with other aspects of their environment while operating the portable electronic device. However, this hindrance is at least partially overcome by making the display screen of the portable electronic device wearable, as is the case with head-mounted displays. Making the display screen of the portable electronic device wearable enables the user to see, access, and/or receive feedback from the display screen without using their hand(s). In recent years, head-mounted displays have begun to gain wider acceptance, with a number of recently introduced head-mounted display devices having the potential for widespread adoption by consumers.

To date, interfaces for controlling our otherwise interacting with content displayed on head-mounted displays have been unsatisfactory. In the case of wearable heads-up displays, the challenge is to simultaneously provide sophisticated control capabilities with an inconspicuous, substantially hands-free interface mechanism having a minimal form factor. Various schemes (e.g., voice control, a touch pad on-board the frames of the wearable heads-up display itself, a hand-held remote tethered to the wearable heads-up display through a wired connection, and so on) have been proposed but none of them satisfies all of the criteria specified above (namely, sophisticated control, inconspicuous and substantially hands-free, with minimal form factor). Interacting with the content displayed on a wearable heads-up display remains a technical challenge that must be overcome in order for such displays to become more adopted by consumers.

BRIEF SUMMARY

A system that enables interaction with content displayed on a head-mounted display may be summarized as including: a head-mounted display including: at least one display positioned in a field of view of at least one eye of a user when the head-mounted display is worn on a head of the user; a processor communicatively coupled to the at least one display; a non-transitory processor-readable storage medium communicatively coupled to the processor, wherein the non-transitory processor-readable storage medium stores processor-executable instructions and/or data that, when executed by the processor, cause the at least one display to display at least one object that is responsive to a selection operation performed by the user; and a wireless receiver to wirelessly receive signals, the wireless receiver communicatively coupled to the processor; an eye-tracker communicatively coupled to the processor, the eye-tracker to detect that the user is gazing at the at least one object displayed by the at least one display; and a wireless portable interface device with a form factor to be carried by or on the user, the portable interface device physically separate from the head-mounted display, wherein the portable interface device includes at least one actuator that, when activated by the user, causes the portable interface device to wirelessly transmit a signal. The selection operation performed by the user may comprise a substantially concurrent combination of gazing at the least one object displayed by the at least one display and activating the at least actuator of the portable interface device. In response to the selection operation performed by the user, a visual effect may be displayed on the at least one display of the head-mounted display. The non-transitory processor-readable storage medium may further store processor-executable instructions and/or data that, when executed by the processor in response to the wireless receiver wirelessly receiving the signal from the portable interface device, cause the processor to: request current gaze direction data from the eye-tracker; identify a particular object at which the user is gazing based on the current gaze direction data received from the eye-tracker, the particular object identified among the at least one object displayed by the at least one display; and cause the at least one display to display the visual effect on the particular object.

The portable interface device may be batteryless and may include a piezoelectric element communicatively coupled to the actuator and an antenna communicatively coupled to the piezoelectric element. The wireless receiver of the head-mounted display may include a radio frequency receiver. When activated by the user, the actuator may mechanically actuate the piezoelectric element. In response to the mechanical actuation, the piezoelectric element may generate an electric signal. In response to the electric signal generated by the piezoelectric element, the antenna may transmit a radio frequency signal.

The portable interface device may be batteryless and may include a mechanical resonator physically coupled to the actuator. The wireless receiver of the head-mounted display may include at least one of: a microphone and/or a piezoelectric element tuned to be responsive to a sonic signal. When activated by the user, the actuator may mechanically actuate the mechanical resonator. In response to the mechanical actuation, the mechanical resonator may generate the sonic signal. The sonic signal may include an ultrasonic signal.

The object may include at least one object selected from a group consisting of: a menu item, a graphical button, a keyboard key, a notification, one of multiple objects displayed by the at least one display of the head-mounted display, a file, a folder, and an alphanumeric character. The portable interface device may include a wearable device selected from a group consisting of: a ring, a wristband, and an armband. The actuator of the portable interface device may include a button. The eye-tracker may be carried by and physically coupled to the head-mounted display.

A method of operating a system, wherein the system comprises a head-mounted display, an eye-tracker, and a wireless portable interface device, the portable interface device physically separate from the head-mounted display, may be summarized as including: displaying an object within a field of view of at least one eye of a user by at least one display of the head-mounted display; receiving a selection operation from the user by the system, wherein receiving a selection operation from the user by the system includes: detecting, by the eye tracker, that the user is gazing at the object; while detecting, by the eye tracker, that the user is gazing at the object, receiving, by the portable interface device, an activation from the user of an actuator of the portable interface device; in response to receiving, by the portable interface device, the activation from the user of the actuator of the portable interface device, wirelessly transmitting a signal by the portable interface device; and wirelessly receiving the signal by a wireless receiver of the head-mounted display; and in response to receiving the selection operation from the user by the system, displaying a visual effect by the at least one display of the head-mounted display. The head-mounted display may include a processor and a non-transitory processor-readable storage medium communicatively coupled to the processor. The non-transitory processor-readable storage medium may store processor-executable instructions and/or data and the method may include executing, by the processor, the processor-executable instructions and/or data stored in the non-transitory processor-readable storage medium to cause: the at least one display of the head-mounted display to display the object within the field of view of at least one eye of the user; and the at least one display of the head-mounted display to display the visual effect in response to the system receiving the selection operation from the user.

The portable interface device may be batteryless and may include a piezoelectric element communicatively coupled to the actuator and an antenna communicatively coupled to the piezoelectric element, and the wireless receiver of the head-mounted display may include a radio frequency receiver. In this configuration, receiving, by the portable interface device, an activation from the user of an actuator of the portable interface device may include receiving, by the portable interface device, a mechanical actuation of the piezoelectric element from the user. In response to the mechanical actuation, the piezoelectric element may generate an electric signal. Wirelessly transmitting a signal by the portable interface device may include wirelessly transmitting a radio frequency signal by the antenna of the portable interface device in response to the electric signal generated by the piezoelectric element. Wirelessly receiving the signal by a wireless receiver of the head-mounted display may include wirelessly receiving the radio frequency signal by the radio frequency receiver of the head-mounted display.

The portable interface device may be batteryless and may include a mechanical resonator physically coupled to the actuator. In this configuration, receiving, by the portable interface device, an activation from the user of an actuator of the portable interface device may include receiving, by the portable interface device, a mechanical actuation of the mechanical resonator from the user. In response to the mechanical actuation, the mechanical resonator may generate a sonic signal. Wirelessly transmitting a signal by the portable interface device may include wirelessly transmitting the sonic signal by mechanical resonator of the portable interface device. Wirelessly receiving the signal by a wireless receiver of the head-mounted display may include wirelessly receiving the sonic signal by the wireless receiver of the head-mounted display, wherein the wireless receiver of the head-mounted display includes at least one of: a microphone and/or a piezoelectric element tuned to be responsive to the sonic signal. The sonic signal generated by the mechanical resonator of the portable interface device may include an ultrasonic signal.

The portable interface device may include an on-board power source and a radio frequency transmitter. Wirelessly transmitting a signal by the portable interface device may include wirelessly transmitting a radio signal by the radio frequency transmitter of the portable interface device, the radio signal having a frequency in a range of 10 MHz to 10 GHz. Wirelessly receiving the signal by a wireless receiver of the head-mounted display may include wirelessly receiving the radio signal by the wireless receiver of the head-mounted display, and wherein the wireless receiver of the head-mounted display includes a radio frequency receiver.

A completely wearable human-electronics interface may be summarized as including: a wearable heads-up display including a wireless receiver; an eye-tracker carried by the wearable heads-up display; and a wearable actuator including a wireless transmitter to transmit wireless signals to the wireless receiver of the wearable heads-up display. The wearable heads-up display may further include a processor that is communicatively coupled to both the eye-tracker and the wireless receiver, the processor to effect interactions with content displayed by the wearable heads-up display in response to concurrent inputs from both the eye-tracker and the wearable actuator.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with head-mounted displays and electronic devices have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for interacting with content displayed on head-mounted displays. Such includes an interface having a minimal form factor that enables sophisticated control interactions to be carried out in an inconspicuous, substantially hands-free manner. All of this is achieved with a multi-modal and fully-wearable interface that combines substantially concurrent inputs from both an eye tracker and a wireless portable interface device.

Figure 1:
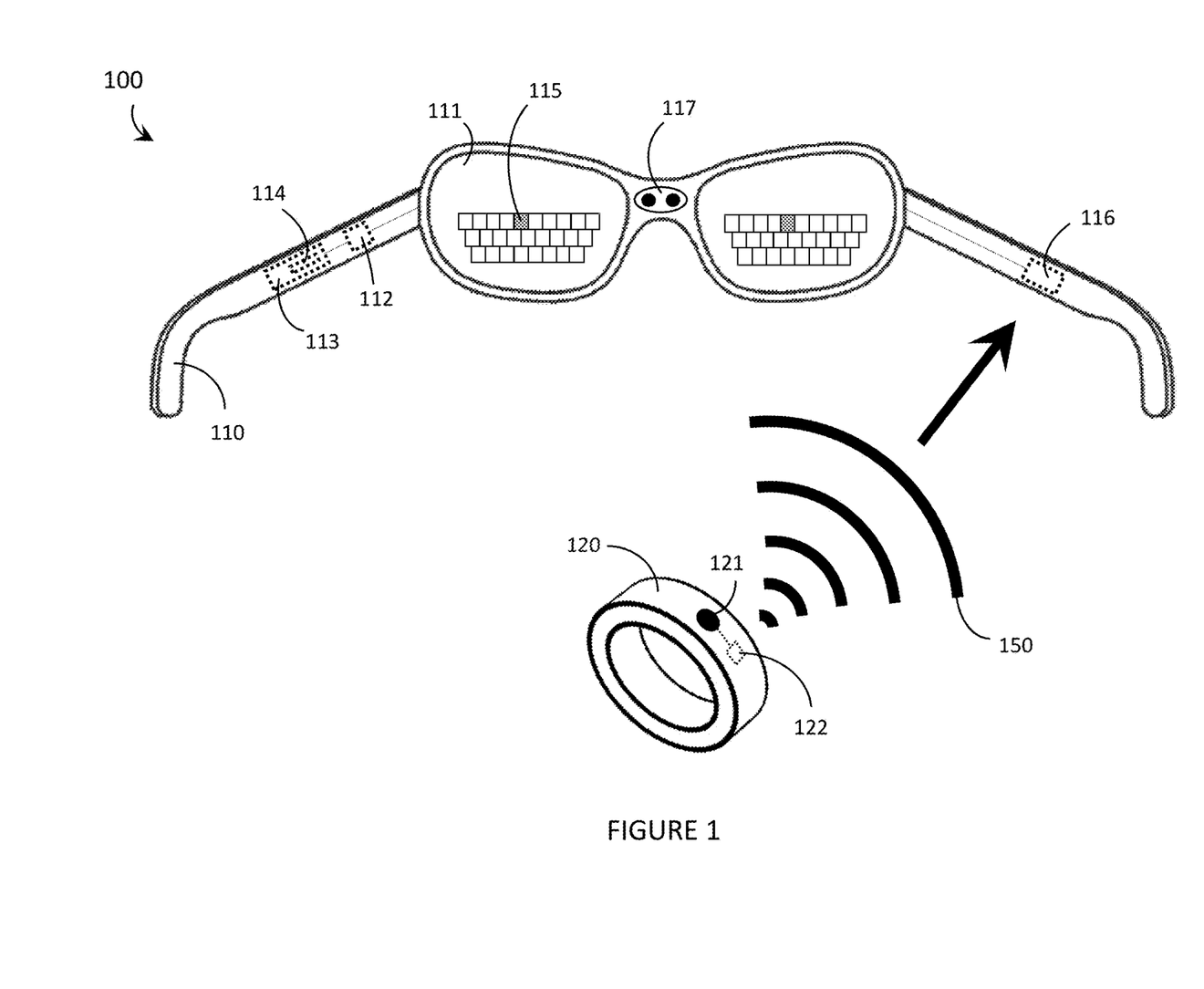
FIG. 1 is an illustrative diagram showing an exemplary system that enables interaction with content displayed on a head-mounted display in accordance with the present systems, devices, and methods.

FIG. 1 is an illustrative diagram showing an exemplary system 100 that enables interaction with content displayed on a head-mounted display ("HMD") 110 in accordance with the present systems, devices, and methods. The HMD 110 of system 100 includes at least one display 111 (two such displays illustrated in FIG. 1) positioned in the field of view of at least one eye of a user when HMD 110 is worn on the user's head. One or more display(s) 111 may employ one or more waveguide(s), one or more microdisplay(s), and/or any or all of the display technologies described in U.S. Patent Application Publication 2015-0205134, U.S. Non-Provisional patent application Ser. No. 14/749,341 (now U.S. Patent Application Publication 2015-0378164), U.S. Non-Provisional patent application Ser. No. 14/749,351 (now U.S. Patent Application Publication 2015-0378161), U.S. Non-Provisional patent application Ser. No. 14/749,359 (now U.S. Patent Application Publication 2015-0378162), U.S. Provisional Patent Application Ser. No. 62/117,316, U.S. Provisional Patent Application Ser. No. 62/134,347 (now U.S. Patent Application Publication 2016-0274365), and/or U.S. Provisional Patent Application Ser. No. 62/156,736 (now U.S. Non-Provisional patent application Ser. Nos. 15/145,576, 15/145,609, and 15/145,583). HMD 110 also includes a processor 112 communicatively coupled to the at least one display 111 and a non-transitory processor-readable storage medium or memory 112 communicatively coupled to processor 112. Memory 113 stores data and/or instructions 114 (i.e., processor-executable instructions) that, when executed by processor 112 of HMD 110, cause the at least one display 111 to display at least one object 115 that is responsive to a selection operation performed by the user.

HMD 110 also includes a receiver 116 (e.g., a wireless receiver, or a wireless transceiver including a wireless receiver) operative to wirelessly receive signals. Receiver 116 is communicatively coupled to processor 112.

System 100 further includes an eye-tracker 117 that is operative to detect the eye position and/or gaze direction of at least one eye the user and communicatively coupled to processor 112. Eye-tracker 117 includes at least one camera or photodetector to measure light (e.g., visible light or infrared light) reflected from the at least one eye and processor 112 may determine the eye position or gaze direction of the at least one eye based on the measured reflections. Eye-tracker 117 may implement the technology described in U.S. Provisional Patent Application Ser. No. 62/167,767 (now U.S. Non-Provisional patent application Ser. Nos. 15/167,458 and 15/167,472). In the present systems, devices, and methods, eye-tracker 117 is operative to detect that the user is gazing at (e.g., looking, staring or generally pointing his or her eye(s) in the direction of) the at least one object 115 displayed by the at least one display 111. In the illustrated example of FIG. 1, eye-tracker 117 is carried by HMD 110, though in alternative implementations eye-tracker 117 may be physically separate from HMD 110.

System 100 provides a multi-modal interface for interacting with content displayed on a head-mounted display. A first mode of interaction (i.e., via eye position and/or gaze direction) is realized by eye-tracker 117. For a second mode of interaction, system 100 further includes a wireless portable interface device 120 with a form factor to be carried by or on the user. In the illustrated example of FIG. 1, portable interface device 120 has the general size and geometry of a ring to be worn on a finger or thumb of the user. In other implementations, portable interface device 120 may be a wristband or an armband, or may adopt a non-annular form factor that clips, sticks, or otherwise attaches to the user or the user's clothing (e.g., a pen with a clip). Portable interface device 120 is physically separate from HMD 110 and includes at least one actuator 121 (e.g., a button, switch, toggle, lever, dial, or similar component) that, when activated by the user, causes portable interface device 120 to wirelessly transmit a signal from a wireless signal generator 122.

Portable interface device 120 may include a portable power source, such as a battery or a supercapacitor (i.e., capacitor with capacitance on the order of 0.01 F or greater). Alternatively, portable interface device 120 may be "batteryless." Throughout this specification and the appended claims, the term "batteryless" literally means "without any battery or batteries" (or any other equivalent device providing a similar function, such as a supercapacitor) and is generally used to indicate that the corresponding device (e.g., portable interface device 120) has no on-board battery or other source of pre-stored (i.e., generated off of the device and stored therein) power.

Portable interface device 120 is generally described as a wireless device. As used herein, the term "wireless" literally means "without any external wire-connections to anything" and is generally used to indicate that the corresponding device (e.g., portable interface device 120) is untethered with no external wire-connection(s) (or optical fiber connections, or cable connections, etc.) to any other electronic device or to any source of electric power. Thus, in implementations in which portable interface device 120 is both batteryless and wireless, then in the absence of any actuation (as described in more detail later on), portable interface device 120 is generally without any electric power.

Wearable electronic devices are typically larger and bulkier than other wearable accessories, such as traditional jewelry. This is at least in part because the form factor of wearable electronic devices typically must accommodate large and bulky components, such as an on-board battery, that are required for the wearable electronic device to operate. In the present systems, devices and methods, portable interface device 120 is wireless (and may, in some implementations, be batteryless) in order to remove the large and bulky electric components (e.g., a battery and/or a charging port, if batteryless) and provide a small and compact form factor not typically seen among wearable electronic devices. However, even in batteryless implementations, portable interface device 120 may still operate electrically using electric signals generated upon mechanical actuation by, for example, one or more on-board piezoelectric component(s).

Portable interface device 120 only includes one actuator or "button" 121. Other implementations may include a second and even a third actuator, but in general portable interface device 120 includes very few actuators in order to minimize its form factor. In the illustrated example of FIG. 1, actuator 121 may provide a "select" function in combination with whatever the user is gazing at on at least one display 111 of HMD 110 as detected by eye-tracker 117 and determined by processor 112. As previously described, memory 113 of HMD 110 stores processor-executable instructions and/or data 114 that, when executed by processor 112 of HMD 110, cause the at least one display 111 to display at least one object 115 that is responsive to a selection operation performed by the user. In accordance with the present systems, devices, and methods, the selection operation performed by the user may comprise a substantially concurrent combination of gazing at the least one object 115 displayed by the at least one display 111 (as detected by eye-tracker 117) and activating the at least actuator 121 of the portable interface device 120. The selection operation may be effected by HMD 110 (e.g., by processor 112 of HMD 110) in response to receipt of a wireless "selection signal" 150 at receiver 116 transmitted from wireless signal generator 122 of portable interface device 120, and the selection operation may include "selecting" whatever object 115 on display 111 that eye tracker 117 identifies the user is looking/gazing at when the wireless selection signal 150 is receiver at receiver 116. To this end, when wireless receiver 116 of HMD 110 receives a wireless signal 150 from portable interface device 120, processor 112 executes processor-executable instructions and/or data 114 stored in memory 113, which cause processor 112 to: i) request current gaze direction data from eye-tracker 117; ii) identify a particular object 115 at which the user is gazing based on the current gaze direction data received from eye-tracker 117 (e.g., the particular object identified among at least one object displayed by at least one display 111); and iii) cause at least one display 111 to display the visual effect on the particular object 115.

Generally, in response to the selection operation performed by the user, a visual effect may be displayed or rendered on the at least one display 111 of HMD 110. The visual effect may include: highlighting the object 115, visually changing or modifying the object 115, displaying new or changed content elsewhere on the display 111, or changing other aspects of the displayed content (including replacing the displayed content with new displayed content) based on the object 115 selected by the user. The object 115 may be any displayed image depending on the specific application and/or user interface, including without limitation: a menu item, a graphical button, a keyboard key, a notification, one of multiple objects displayed by the at least one display 111 of HMD 110, a file, a folder, and/or an alphanumeric character. In the illustrated example of FIG. 1, display 111 displays a representation of a virtual keyboard and the specific object 115 selected by the user corresponds to a specific key (i.e., letter) of the keyboard. Based on a typical qwerty keyboard configuration, the position of the selected key/letter corresponds to the letter "T."

Thus, as an exemplary application, system 100 may be used to enable the user to type by: i) displaying a virtual keyboard on at least one display 111 and, over a number of instances: ii) detecting which letter the user is gazing at by eye-tracker 117, and iii) selecting the letter that the user is gazing at when the user activates actuator 121 of portable interface device 120.

As described previously, the form factor of wearable electronic devices is a very important consideration in their design and can ultimately determine whether or not a wearable electronic device will be adopted by users. The present systems, devices, and methods provide a portable interface device 120 for interacting with content displayed on a HMD 110, where the portable interface device 120 has minimal bulk associated with its technological capabilities and may approximate the form factor of traditional jewelry or other accessories. This aspect of the portable interface device 120 is enabled by making the portable interface device 120 wireless and, in some implementations, batteryless.

Even batteryless and wireless implementations of portable interface device 120 may still be used to wirelessly transmit signals to HMD 110. The present systems, devices, and methods provide two example configurations that enable portable interface device 120 to wirelessly transmit signals despite being a batteryless and wireless device.

As a first example, portable interface device 120 may include a piezoelectric element communicatively coupled to actuator 121 and a radio frequency antenna 122 communicatively coupled to the piezoelectric element. When activated (e.g., pressed, pushed, depressed, switched, or similar) by the user, actuator 121 mechanically actuates the piezoelectric element. In response to the mechanical actuation, the piezoelectric element generates an electric signal. This electric signal is communicatively coupled to radio frequency antenna 122 where, in response to the electric signal, antenna 122 wirelessly transmits a wireless (e.g., radio frequency) signal. Antenna 122 (and associated circuitry) may be designed to wirelessly transmit a radio frequency or microwave frequency signal 150 having a specific frequency or within a specific range of frequencies. In this configuration, receiver 116 of HMD 110 includes a radio frequency or microwave receiver that is advantageously tuned to be responsive to radio or microwave signals in the range of signal 150 wirelessly transmitted by antenna 122 of portable interface device 120.

As a second example, portable interface device 120 may include a mechanical resonator 122 physically coupled to actuator 121. When activated (e.g., pressed, pushed, depressed, switched, or similar) by the user, actuator 121 mechanically actuates (e.g., strikes, impacts, oscillates, vibrates, or similar) mechanical resonator 122. In response to the mechanical actuation, mechanical resonator 122 generates a sonic, acoustic, or aural signal 150 of a specific frequency (or in a specific range of frequencies). The sonic signal may be an ultrasonic signal. In this configuration, receiver 116 of HMD 110 includes a microphone and/or a piezoelectric element that may be tuned to be responsive to sonic signals in the range of sonic signal 150 wirelessly transmitted by mechanical resonator 122 of portable interface device 120.

Thus, in the present systems, devices, and methods, a signal 150 that is "wirelessly transmitted" may exist in a variety of different forms, including without limitation: a radio frequency signal, a sonic signal (such as an ultrasonic signal), an optical signal (generated by a mechanoluminescent material, such as a piezoluminescent alkali halide or a triboluminescent mineral), a photonic signal, a thermal signal, and so on. Generally, a signal that is "wirelessly transmitted" is any signal that is transmitted through any medium other than a conductive wire.

In implementations in which portable interface device 120 does include an on-board power source, such as a battery or a supercapacitor (i.e., in implementations in which portable interface device 120 is not batteryless), portable interface device 120 may be configured to transmit (and receiver 116 of HMD 110 may be configured to receive) more conventional wireless signals, such as short-wavelength radio wave signals in the range of 10 MHz-10 GHz. For example, wireless signal generator 122 may include a wireless transmitter (e.g., a wireless transceiver including a wireless transmitter) designed and operated to transmit (and receiver 116 may be designed and operated to receive) wireless signals using an established wireless communication protocol, including without limitation: Bluetooth®, Bluetooth® Low-Energy, Bluetooth Smart®, ZigBee®, WiFi®, Near-Field Communication (NFC), or the like.

Figure 2:
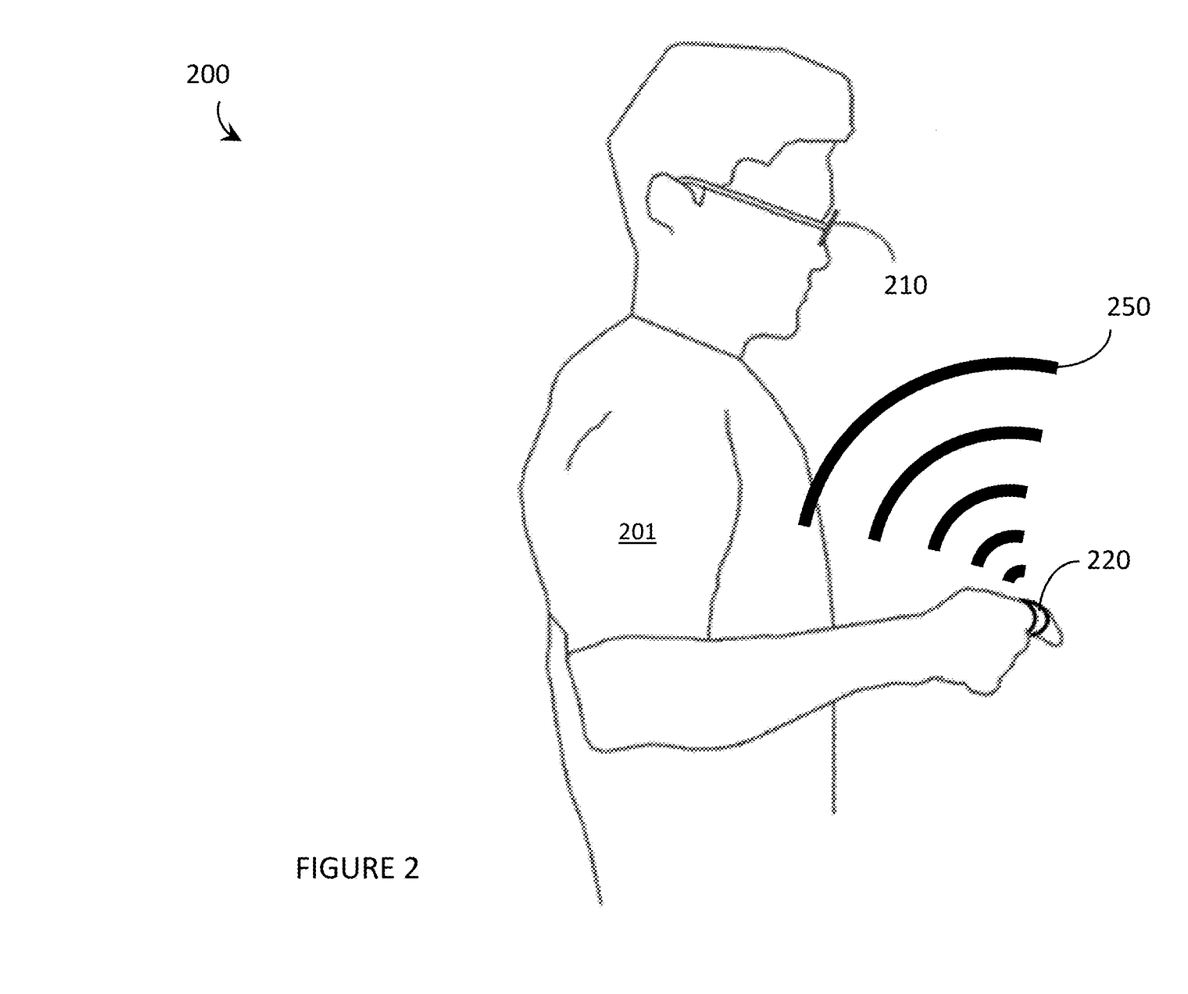
FIG. 2 is an illustrative diagram showing a human-electronics interface in which a user wears a system that enables the user to interact with displayed content in accordance with the present systems, devices, and methods.

FIG. 2 is an illustrative diagram showing a human-electronics interface 200 in which a user 201 wears a system that enables the user to interact with displayed content in accordance with the present systems, devices, and methods. The system comprises a HMD 210 and a portable interface device 220. HMD 210 is substantially similar to HMD 110 from FIG. 1 and portable interface device 220 is substantially similar to portable interface device 120 from FIG. 1. In FIG. 2, portable interface device 220 is shown having the form factor of a ring and worn on a finger of user 201; however, in alternative implementations portable interface device 220 may adopt a different form factor and be worn elsewhere on/by user 201, such as a wristband, an armband, or a device that clips, affixes, or otherwise couples to user 201 or to an article of clothing worn by user 201. In general, it is advantageous for the actuator (121 in FIG. 1, not visible in FIG. 2) of portable interface device 220 to be easily and inconspicuously accessible to user 201. In the case of a ring worn on the index finger of user 201, an actuator on portable interface device 220 may be easily and inconspicuously activated by the adjacent thumb of user 201. As previously described, activation of the actuator causes portable interface device 220 to wirelessly transmit a signal 250 (e.g., a radio frequency signal, a sonic signal such as an ultrasonic signal, an optical or photonic signal, or similar) and HMD 210 includes a receiver that wirelessly receives signal 250. If signal 250 is received by HMD 210 while an eye-tracker on HMD 210 detects that user 201 is gazing at an object displayed on HMD 210 that is responsive to a selection operation, then the combination of user 201 gazing at the object displayed by HMD 210 and substantially concurrently activating the actuator of portable interface device 220 effects the selection operation. In response to the selection operation, HMD 210 may display a visual effect to user 201.

Figure 3:
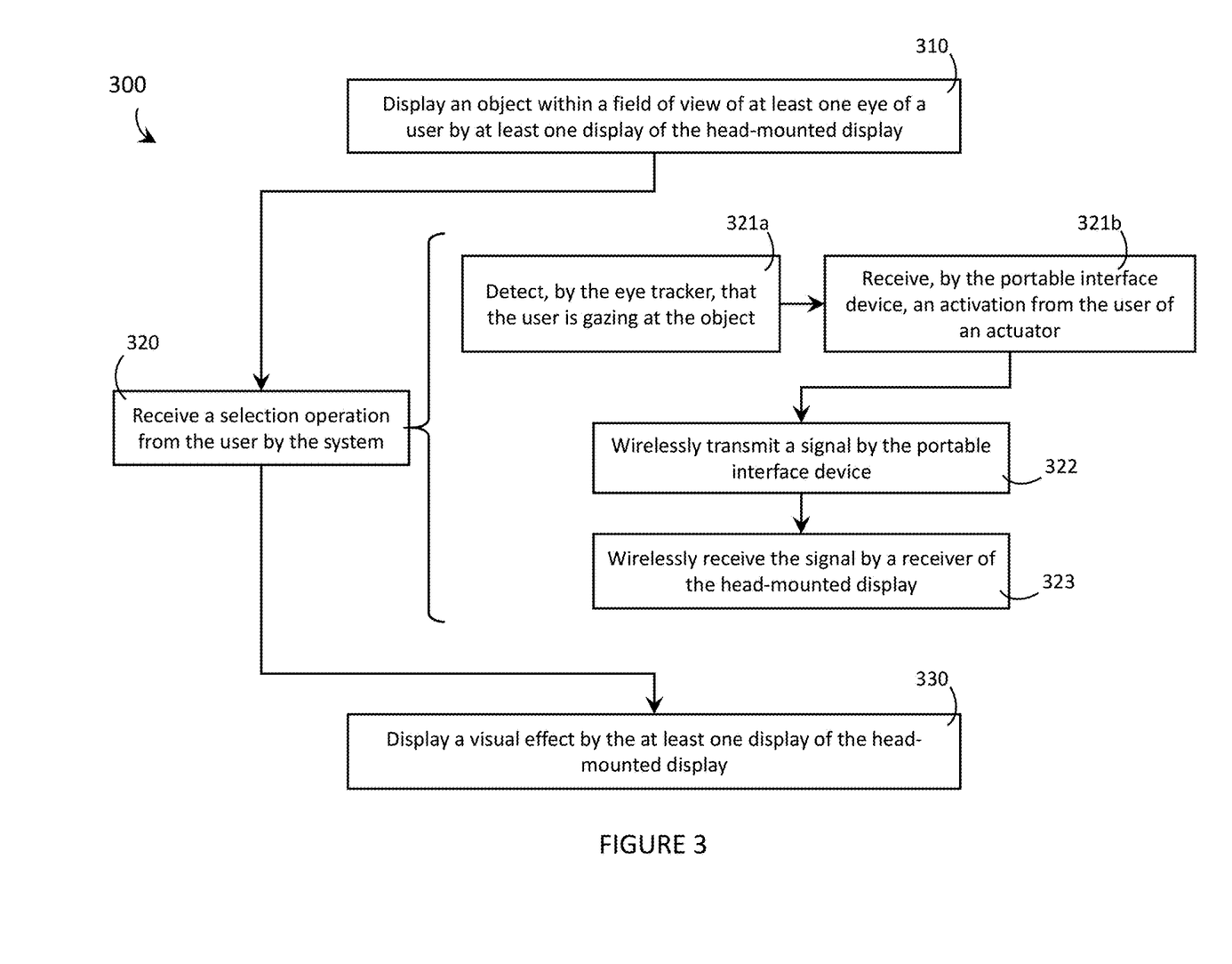
FIG. 3 is a flow-diagram showing an exemplary method of operating a system in accordance with the present systems, devices, and methods.

FIG. 3 is a flow-diagram showing an exemplary method 300 of operating a system in accordance with the present systems, devices, and methods. The system (e.g., substantially similar to system 100 from FIG. 1) comprises a HMD (e.g., 110), an eye-tracker (e.g., 117), and a portable interface device (e.g., 120), the portable interface device (120) physically separate from the HMD (110). As previously described, the portable interface device is a wireless device and, in some implementations, may be a batteryless device. Throughout the description of method 300 that follows, reference is often made to the elements of system 100 from FIG. 1. A person of skill in the art will appreciate that the elements of system 100 are cited in relation to various acts as illustrative examples only and that the methods described herein may be implemented using systems and/or devices that differ from exemplary system 100 illustrated in FIG. 1. The scope of the present systems, devices, and methods should be construed based on the appended claims and not based on the illustrative example embodiments described in this specification. For this reason, throughout the description of method 300 references to elements of system 100 from FIG. 1 are placed in parentheses to indicate that such references are non-limiting and used for illustrative purposes only.

Method 300 includes three acts 310, 320, and 330, though act 320 further includes four sub-acts 321a, 321b, 322, and 323. Those of skill in the art will appreciate that in alternative embodiments certain acts/sub-acts may be omitted and/or additional acts/sub-acts may be added. Those of skill in the art will also appreciate that the illustrated order of the acts/sub-acts is shown for exemplary purposes only and may change in alternative embodiments.

At 310, at least one display (111) of the HMD (110) displays an object (115) within the field of view of at least one eye of the user. The object (115) is responsive to a selection operation performed by the user and may, as previously described, include without limitation: a menu item, a graphical button, a keyboard key, a notification, one of multiple objects displayed by the at least one display (111) of the HMD (110), a file, a folder, and/or an alphanumeric character.

At 320, the system (100) receives a selection operation from the user. As previously described, the selection operation performed by the user may comprise a combination of two substantially concurrent portions: i) the user gazing at the at least one object (115) displayed by the at least one display (111) per 310 and ii) the user activating at least one actuator of the portable interface device (120). The selection operation involves multiple inputs of different modes and communication between different devices in system (100). Act 320 comprises sub-acts 321a, 321b, 322, and 323 that collectively define the receipt of the components of the selection operation by and between the components of the system (100).

At 321a, the eye-tracker (117) of the system (100) detects that the user is gazing at the object (115) displayed at 310. Sub-act 321a provides a first portion of act 320. More specifically, at sub-act 321a the system (100) receives a first portion of the selection operation that is received at 320, that first portion corresponding to the "user gazing at the object (115)" portion of the selection operation detected and/or determined by the eye tracker (117).

At 321b, the portable interface device (120) of the system (100) receives a second portion of the selection operation an activation of at least one actuator (121) by the user). The portable interface device (120) may receive an activation of at least one actuator (121) from the user by, for example, having at least one actuator (121) be activated by the user. Sub-acts 321a and 321b are connected by a horizontal arrow in FIG. 3 to indicate that the two sub-acts are substantially concurrent (i.e., sub-acts 321a and 321b are performed substantially concurrently). Generally, the user activates the actuator (121) of the portable interface device (120) per 321b while the user is gazing at an object (115) that the user wishes to select, as detected by the eye-tracker (117) per 321a. This combination of actions performed by the user (e.g. gazing while activating the actuator) is an example of a multi-modal selection operation in accordance with the present systems, devices, and methods.

At 322, a transmitter or signal generator (122) of the portable interface device (120) wirelessly transmits a signal (150) in response to the at least one actuator (121) being activated by the user at 321b.

At 323, a receiver (116) of the HMD (110) wirelessly receives the signal (150) wirelessly transmitted by the portable interface device (120) at 322. Where sub-acts 321a provided a first portion of act 320, the combination of sub-acts 321b, 322, and 323 provides a second portion of act 320. More specifically, over sub-acts 321b, 322, and 323, the system (100) receives, via the portable interface device (120), a second portion of the selection operation that is received at 320, that second portion being the "user activating an actuator" portion of the selection operation provided by the portable interface device (120). With the selection operation thus received, method 300 proceeds to act 330.

At 330, the at least one display (111) of the HMD (110) displays or renders a visual effect in response to receiving the selection operation from the user per 320. As previously described, the visual effect may include, as non-limiting examples, any or all of: highlighting the object (115), visually changing or modifying the object (115), displaying new or changed content elsewhere on the display (111), or changing other aspects of the displayed content (including replacing the displayed content with new displayed content) based on the object (115) selected by the user.

The HMD (110) of the system (100) may include a processor (112) communicatively coupled to the at least one display (111) and a non-transitory processor-readable storage medium or memory (113) communicatively coupled to the processor (112). The memory (113) may store data and/or instructions (i.e., processor-executable instructions 114) that, when executed by the processor (112), cause: i) the at least one display (111) of the HMD (110) to display the object (115) within the field of view of at least one eye of the user per act 310, and ii) the at least one display (111) of the HMD (110) to display the visual effect to the user per act 330 in response to the system (100) receiving the selection operation from the user per act 320.

As described in the context of system 100 illustrated in FIG. 1, the portable interface device (120) of the system (100) may be implemented in a variety of different ways. Further details of sub-acts 321b, 322, and 323 of method 300 may depend on the nature of the portable interface device (12) being implemented.

In a first example implementation, the portable interface device (120) may comprise a batteryless and wireless portable interface device that includes a piezoelectric element communicatively coupled to the actuator (121) and a radio frequency antenna (122) communicatively coupled to the piezoelectric element and tuned to wirelessly transmit radio frequency signals (150) of a specific frequency or in a specific range of frequencies. The receiver (116) of the HMD (110) may comprise a radio frequency receiver (116) tuned to wirelessly receive radio frequency signals (150) of the specific frequency or in the specific range of frequencies. In this first example implementation, the portable interface device (120) may receive a mechanical actuation of the piezoelectric element from the user at sub-act 321b of method 300. As before, the portable interface device (120) may receive or experience a mechanical actuation of the piezoelectric element from the user by, for example, having the piezoelectric element be mechanically actuated by the user. In response to the mechanical actuation, the piezoelectric element may generate an electric signal that communicatively couples to the radio frequency antenna (122) of the portable interface device (120), and in response to this electric signal the radio frequency antenna may wirelessly transmit a radio frequency signal (150) at sub-act 322 of method 300. At sub-act 323, the radio frequency receiver (116) of the HMD (110) may wirelessly receive the radio frequency signal (150).

In a second example implementation, the portable interface device (120) may comprise a batteryless and wireless portable interface device that includes a mechanical resonator (122) physically coupled to the actuator (121) and tuned to wirelessly transmit sonic, acoustic, or aural signals (150), such as ultrasonic signals, of a specific frequency or in a specific range of frequencies. The receiver (116) of the HMD (110) may comprise a microphone and/or a piezoelectric element tuned to be responsive to sonic signals (150) of the specific frequency or in the specific range of frequencies. In this second example implementation, the portable interface device (120) may receive a mechanical actuation of the mechanical resonator (122) from the user at sub-act 321b of method 300. As before, the portable interface device (120) may receive or experience a mechanical actuation of the mechanical resonator (122) from the user by, for example, having the mechanical resonator (122) be mechanically actuated by the user. In response to the mechanical actuation, the mechanical resonator (122) may generate a sonic signal (150), such as an ultrasonic signal, which is wirelessly transmitted at sub-act 322 of method 300. At sub-act 323, the microphone and/or tuned piezoelectric element (116) of the HMD (110) may wirelessly receive the sonic signal (150).

In a third example implementation, the portable interface device (120) may comprise a wireless portable interface device that includes an on-board power source, such as a battery or a supercapacitor (and either a wireless charging coil or a tethered connector port for charging said on-board power source). In this third example implementation, the portable interface device (120) may include a wireless transmitter (122; e.g., an antenna and/or a wireless transceiver that includes a wireless transmitter) electrically coupled to the actuator (121) and operative to wirelessly transmit radio frequency signals (150) that embody an established wireless communication protocol, such as without limitation: Bluetooth®, Bluetooth® Low-Energy, Bluetooth Smart®, ZigBee®, WiFi®, Near-Field Communication (NFC), or the like. Such protocols typically employ radio frequency signals in the range of 1 GHz to 10 GHz (with the exception of NFC, which operates in the 10 MHz-20 MHz range) and may include pairing or otherwise establishing a wireless communicative link between the portable interface device (120) and the HMD (110). The receiver (116) of the HMD (110) may comprise a wireless receiver or antenna (e.g., a wireless transceiver that includes a wireless receiver or antenna) tuned to be responsive to radio frequency signals (150) of the specific frequency or in the specific range of frequencies transmitted by the wireless transmitter (122) of the portable interface device (120). In this third example implementation, the portable interface device (120) may receive an actuation of the actuator (121) from the user at sub-act 321b of method 300. As before, the portable interface device (120) may receive or experience an actuation of the actuator (121) from the user by, for example, having the actuator (121) be physically actuated (e.g., depressed, switched, twisted, dialed, or similar, depending on the nature of the specific actuator) by the user. In response to the physical actuation, the wireless transmitter (122) may generate a radio frequency signal (150) which is wirelessly transmitted at sub-act 322 of method 300. At sub-act 323, the wireless receiver (116) of the HMD (110) may wirelessly receive the radio frequency signal (150).

The multi-modal interface described herein (comprising an eye tracker and a wireless actuator or button, both of which communicate with a wearable heads-up display) enables sophisticated control of and/or interactions with content displayed by the wearable heads-up display in an inconspicuous, substantially hands-free manner and has a minimal form factor. The sophisticated and inconspicuous aspects of the control interactions are achieved, at least in part, by using the eyes (based on data provided by the eye tracker) to carry out the pointing and "identifying one among many" tasks that can be difficult to perform using hand-controlled interfaces. The eye (more particularly, the gaze thereof) is able to scan over and hone in on aspects of displayed content much more quickly and easily than a hand- or finger-controlled cursor; however, actually specifying a selection operation with the eye alone can be cumbersome because: a) the user is likely to inadvertently gaze at something he or she does not wish to actually select, and b) the mechanisms for doing so, such as a deliberate blink or an extended dwell time, are impractical and lead to an unpleasant user experience. The present systems, devices, and methods take advantage of the versatility and scanning/honing capabilities of the eye/gaze but avoid the specification/selection issues by employing a secondary input mode, a simple wearable actuator such as ring-based button, to actuate the specification/selection function. This wearable actuator is too simplistic to enable sophisticated control interactions on its own, but when used in conjunction with an eye tracker the resulting interface enjoys the best features of both modes. Like the eye tracker, the wearable actuator is similarly inconspicuous and it is "substantially hands-free" because it does not need to be carried by or held in the user's hand. In the case of a ring-based button worn on, for example, the user's index finger, the user may actuate the button simply using his or her thumb and this action may be performed while the user's hand or hands is/are also devoted to another task, such as carrying something(s). The single-button actuator is also extremely low power (even battery-less in some implementations) and its simplicity enables very compact, minimal form factor designs.

The various embodiments described herein provide a multi-modal, portable, and completely wearable interface that enables a user to perform sophisticated interactions with content displayed on a wearable heads-up display in an inconspicuous, substantially hands-free manner. Furthermore, in implementations in which the eye tracker component is integrated into the wearable heads-up display (even integrated with the projection elements of the wearable heads-up display, as described in U.S. Provisional Patent Application Ser. No. 62/167,767, now U.S. Non-Provisional patent application Ser. Nos. 15/167,458 and 15/167,472) and the wireless actuator component is a wearable element, such as a ring-based button, the entire system provides a minimal and inconspicuous form factor. In some implementations, a user wearing the multi-modal interface described herein may be substantially indistinguishable from the same user wearing a conventional pair of eyeglasses and a conventional ring on his or her finger. Such is achieved, at least in part, by: the compact form factor of the wearable heads-up display; the compact form factor of the wearable (e.g., ring-based) actuator; integration of the eye tracker with the wearable heads-up display; and/or the wireless communication between the wearable actuator and the wearable heads-up display.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Non-Provisional patent application Ser. No. 15/282,535, U.S. Provisional Patent Application Ser. No. 62/236,060, U.S. Patent Application Publication 2015-0205134, U.S. Non-Provisional patent application Ser. No. 14/749,341 (now U.S. Patent Application Publication 2015-0378164), U.S. Non-Provisional patent application Ser. No. 14/749,351 (now U.S. Patent Application Publication 2015-0378161), U.S. Non-Provisional patent application Ser. No. 14/749,359 (now U.S. Patent Application Publication 2015-0378162), U.S. Provisional Patent Application Ser. No. 62/117,316, U.S. Provisional Patent Application Ser. No. 62/134,347 (now U.S. Patent Application Publication 2016-0274365), and U.S. Provisional Patent Application Ser. No. 62/156,736 (now U.S. Non-Provisional patent application Ser. Nos. 15/145,576, 15/145,609, and 15/145,583) are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a system, wherein the system comprises a head-mounted display, an eye-tracker carried by the head-mounted display, and an electronic ring with a form factor to be worn on a finger of a user, the electronic ring physically separate from the head-mounted display and the electronic ring including an actuator positioned and oriented to be activatable by a thumb of the user when the electronic ring is worn on the finger of the user, the method comprising:

displaying multiple objects within a field of view of at least one eye of the user by at least one display of the head-mounted display;

receiving a selection operation from the user by the system, wherein receiving a selection operation from the user by the system includes:

receiving, by the electronic ring, an activation from the user of the actuator of the electronic ring;

in response to receiving, by the electronic ring, the activation from the user of the actuator of the electronic ring, wirelessly transmitting a signal by the electronic ring;

wirelessly receiving the signal by a wireless receiver of the head-mounted display;

in response to wirelessly receiving the signal by a wireless receiver of the head-mounted display, requesting, by a processor, current gaze-direction data from the eye-tracker carried by the head mounted display; and identifying, by the processor, a particular object at which the user is gazing among the multiple objects displayed by at least one display of the head-mounted display based on the current gaze-direction data from the eye-tracker; and in response to receiving the selection operation from the user by the system:

displaying a visual effect by the at least one display of the head-mounted display based on the particular object, wherein:

the electronic ring is batteryless and includes a mechanical resonator physically coupled to the actuator, receiving, by the electronic ring, an activation from the user of the actuator of the electronic ring includes receiving, by the electronic ring, a mechanical actuation of the mechanical resonator from the user, in response to the mechanical actuation, the mechanical resonator generates a sonic signal, wirelessly transmitting a signal by the electronic ring includes wirelessly transmitting the sonic signal by mechanical resonator of the electronic ring, and wirelessly receiving the signal by a wireless receiver of the head-mounted display includes wirelessly receiving the sonic signal by the wireless receiver of the head-mounted display, and wherein the wireless receiver of the head-mounted display includes at least one of: a microphone and/or a piezoelectric element tuned to be responsive to the sonic signal.

2. The method of claim 1 wherein the head-mounted display includes a processor and a non-transitory processor-readable storage medium communicatively coupled to the processor, the processor communicatively coupled to the eye-tracker, and wherein the non-transitory processor-readable storage medium stores processor-executable instructions and/or data and the method comprises executing, by the processor, the processor-executable instructions and/or data stored in the non-transitory processor-readable storage medium to cause:

the at least one display of the head-mounted display to display the multiple objects within the field of view of at least one eye of the user;

the wireless receiver of the head-mounted display to receive the signal transmitted by the electronic ring;

the processor to, in response to wirelessly receiving the signal by a wireless receiver of the head-mounted display, request current gaze-direction data from the eye-tracker carried by the head mounted display; and the processor to identify a particular object at which the user is gazing among the multiple objects displayed by at least one display of the head-mounted display based on the current gaze-direction data from the eye-tracker; and the at least one display of the head-mounted display to display the visual effect based on the particular object in response to the system receiving the selection operation from the user.

3. The method of claim 1 wherein the sonic signal generated by the mechanical resonator of the electronic ring includes an ultrasonic signal.

4. The method of claim 1 wherein the particular object includes at least one object selected from a group consisting of: a menu item, a graphical button, a keyboard key, a notification, a file, a folder, and an alphanumeric character.

5. The method of claim 4 wherein the particular object is a menu item, and wherein:

identifying, by the processor, a particular object at which the user is gazing among the multiple objects displayed by at least one display of the head-mounted display based on the current gaze-direction data from the eye-tracker includes identifying, by the processor, the menu item.

6. The method of claim 1 wherein the actuator includes a button positioned and oriented on the electronic ring to be activatable by inconspicuous, substantially hands-free inputs from the user, and wherein:

receiving, by the electronic ring, an activation from the user of the actuator of the electronic ring includes receiving, by the electronic ring, an inconspicuous, substantially hands-free activation from the user of the actuator of the electronic ring.

7. The method of claim 1 wherein:

receiving, by the electronic ring, an activation from the user of the actuator of the electronic ring includes receiving, by the electronic ring, an activation from the thumb of the user of the actuator of the electronic ring; and in response to receiving, by the electronic ring, the activation from the user of the actuator of the electronic ring, wirelessly transmitting a signal by the electronic ring includes wirelessly transmitting the signal by the electronic ring in response to receiving, by the electronic ring, the activation from the thumb of the user of the actuator of the electronic ring.

* * * * *